United States Patent
Solis et al.

(10) Patent No.: US 10,104,092 B2
(45) Date of Patent: Oct. 16, 2018

(54) SYSTEM AND METHOD FOR PARALLEL SECURE CONTENT BOOTSTRAPPING IN CONTENT-CENTRIC NETWORKS

(71) Applicant: CISCO TECHNOLOGY, INC., San Jose, CA (US)

(72) Inventors: Ignacio Solis, South San Francisco, CA (US); Glenn C. Scott, Los Altos, CA (US); Ersin Uzun, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 15/638,038

(22) Filed: Jun. 29, 2017

(65) Prior Publication Data

US 2017/0302681 A1    Oct. 19, 2017

Related U.S. Application Data

(63) Continuation of application No. 14/325,185, filed on Jul. 7, 2014, now Pat. No. 9,699,198.

(51) Int. Cl.
*H04L 29/06* (2006.01)
*H04L 29/08* (2006.01)

(52) U.S. Cl.
CPC ........... *H04L 63/123* (2013.01); *H04L 63/20* (2013.01); *H04L 65/4084* (2013.01); *H04L 65/80* (2013.01); *H04L 67/06* (2013.01); *H04L 67/32* (2013.01); *H04L 67/327* (2013.01)

(58) Field of Classification Search
CPC combination set(s) only.
See application file for complete search history.

(56) References Cited

U.S. PATENT DOCUMENTS

| | | | |
|---|---|---|---|
| 6,681,220 B1 | 1/2004 | Kaplan | |
| 6,981,029 B1 | 12/2005 | Menditto | |
| 7,257,837 B2 | 8/2007 | Xu | |
| 7,509,425 B1 | 3/2009 | Rosenberg | |
| 7,543,064 B2 | 6/2009 | Juncker | |
| 8,224,985 B2 | 7/2012 | Takeda | |
| 8,312,064 B1 | 11/2012 | Gauvin | |
| 2009/0287835 A1* | 11/2009 | Jacobson | H04L 67/104 709/229 |
| 2009/0288163 A1* | 11/2009 | Jacobson | G06F 15/173 726/22 |
| 2010/0195655 A1* | 8/2010 | Jacobson | H04L 45/00 370/392 |

* cited by examiner

*Primary Examiner* — Jeffrey Pwu
*Assistant Examiner* — Samuel Ambaye (57) ABSTRACT

One embodiment of the present invention provides a system for retrieving a content collection over a network. During operation, the system determines additional information associated with the piece of content that is needed for consumption of the content collection; generates a plurality of Interests, which includes at least one Interest for a catalog of the content collection and at least one Interest for the additional information; and forwards, concurrently, the plurality of Interests, thereby facilitating parallel retrieval of the content collection and the additional information.

20 Claims, 8 Drawing Sheets

SYSTEM AND METHOD FOR PARALLEL SECURE CONTENT BOOTSTRAPPING IN CONTENT-CENTRIC NETWORKS

PRIORITY DATA

This Application is a continuation application (and claims the benefit of priority under 35 U.S.C. § 120) of U.S. application Ser. No. 14/325,185 entitled "SYSTEM AND METHOD FOR PARALLEL SECURE CONTENT BOOTSTRAPPING IN CONTENT-CENTRIC NETWORKS," filed on Jul. 7, 2014, Inventors Ignacio Solis et al. The disclosure of this prior application is considered part of the disclosure of this application and is incorporated by reference in its entirety.

BACKGROUND

Field

The present disclosure relates generally to a content-centric network (CCN). More specifically, the present disclosure relates to a system and method for parallel and secure retrieval of content along with information needed for consumption of the content in content-centric networks (CCNs).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-centric Networking (CCN), an exemplary ICN architecture, brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, content objects are signed and potentially encrypted. In order to authenticate and access the content of a file, the content consumer may need to retrieve a number of Content Objects and additionally information about the encryption keys and identities of the publisher. Sequential downloading of each Content Object and the additional key information may need multiple round trips to complete. Hence, before a content consumer can start the consumption of a content piece (which may span multiple Content Objects), the content consumer needs to download the metadata, which sometimes is attached to the end of all consumable content. This means that the content consumer may have to wait until all portions of the content are downloaded to download the decryption key, and hence cannot start consuming the already downloaded content portions.

SUMMARY

One embodiment of the present invention provides a system for retrieving a content collection over a network. During operation, the system determines additional information associated with the piece of content that is needed for consumption of the content collection; generates a plurality of Interests, which includes at least one Interest for a catalog of the content collection and at least one Interest for the additional information; and forwards, concurrently, the plurality of Interests, thereby facilitating parallel retrieval of the content collection and the additional information.

In a variation on this embodiment, the additional information includes one or more of: authentication and/or decryption information associated with the catalog, authentication and/or decryption information associated with the content collection, and authentication revocation information.

In a variation on this embodiment, the plurality of Interests includes at least one Interest for the content collection.

In a further variation, generating the at least one Interest for the content collection involves including one or more of: user credential information and payment information.

In a variation on this embodiment, forwarding the Interests involves at least one of: forwarding one or more Interests to a trust authority and forwarding one or more Interests to a node that caches the content collection.

In a variation on this embodiment, the network is a content-centric network, and the Interests are CCN Interests.

In a variation on this embodiment, the system further receives responses to the plurality of Interests and caches the received responses.

BRIEF DESCRIPTION OF THE FIGURES

In the figures, like reference numerals refer to the same figure elements.

DETAILED DESCRIPTION

Overview

Embodiments of the present invention provide a system and method for parallel retrieval of content and information needed for consumption of the content. More specifically, during operation, when a requester requests a named piece of content (such as a file) over the network, the system determines what kinds of information is needed to consume the content, and retrieves the piece of content and the needed information in parallel. In other words, the process of retrieving the authentication and decryption information is bootstrapped to the content-downloading process.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and optionally other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. Note that the Content Object is not the same as a content component. A Content Object has a specifically defined structure under CCN protocol and its size is normally the size of a network packet (around 1500 bytes for wide area networks and 8000 bytes for local area networks and with fragmentation), whereas a content component is a general term used to refer to a file of any type, which can be an embedded object of a webpage. For example, a webpage may include a number of embedded objects, such as images, video files, or interactive components. Each embedded object is a content component and may span multiple Content Objects.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

Figure 1:
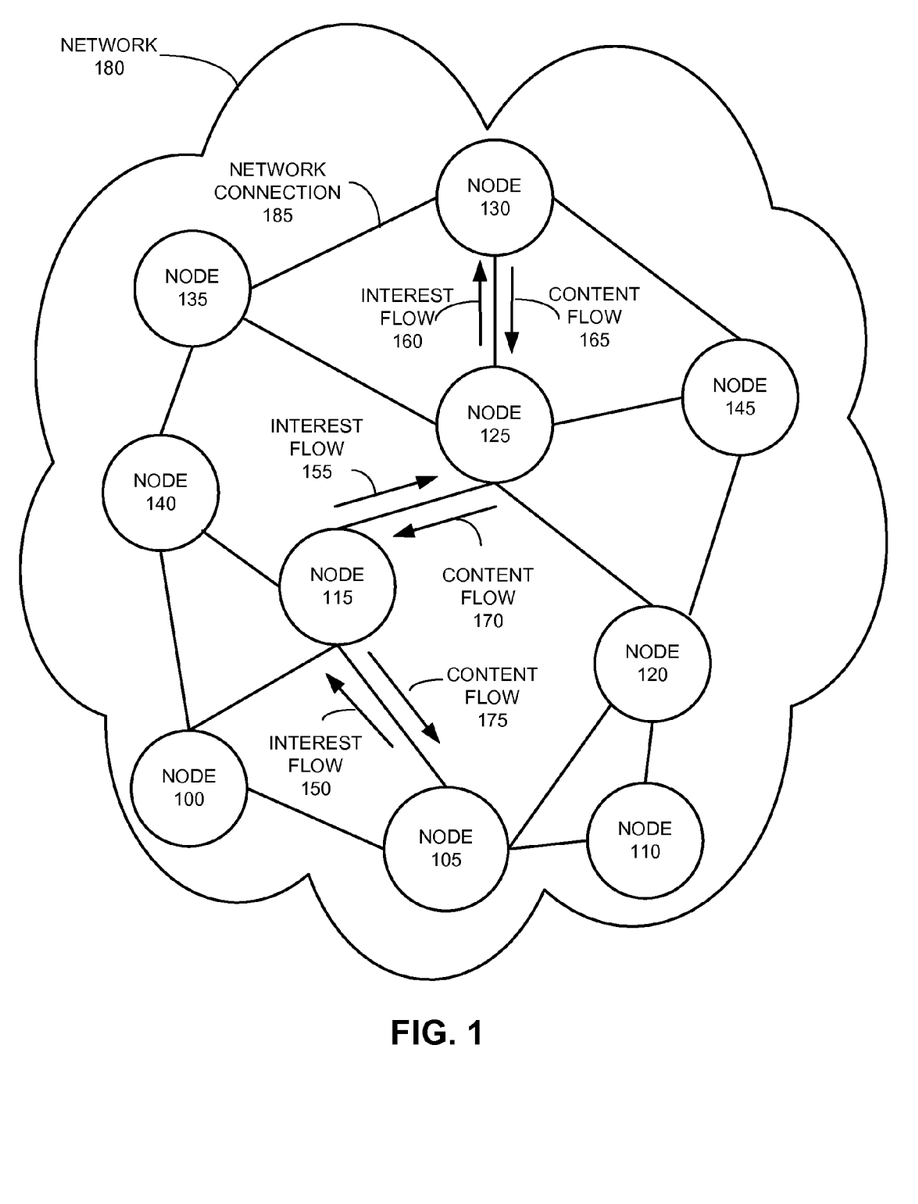
FIG. 1 illustrates an exemplary architecture of a network, in accordance with an embodiment of the present invention.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an endpoint representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

The Manifest

In CCN, a manifest (also known as a catalog) is used to represent a collection of data. For example, a CCN node may contain a video collection that includes a large number of video files, and the manifest of the video collection can be an ordered list identifying the Content Objects corresponding to the video files. Note that, due to the size limit of a Content Object, a video file may span multiple Content Objects. Moreover, a CCN node may store content for a webpage, and the manifest for the web page identifies the different components of the webpage, such as the markup document and embedded objects (including Java scripts, image files, audio files, video files, etc.).

Figure 2:
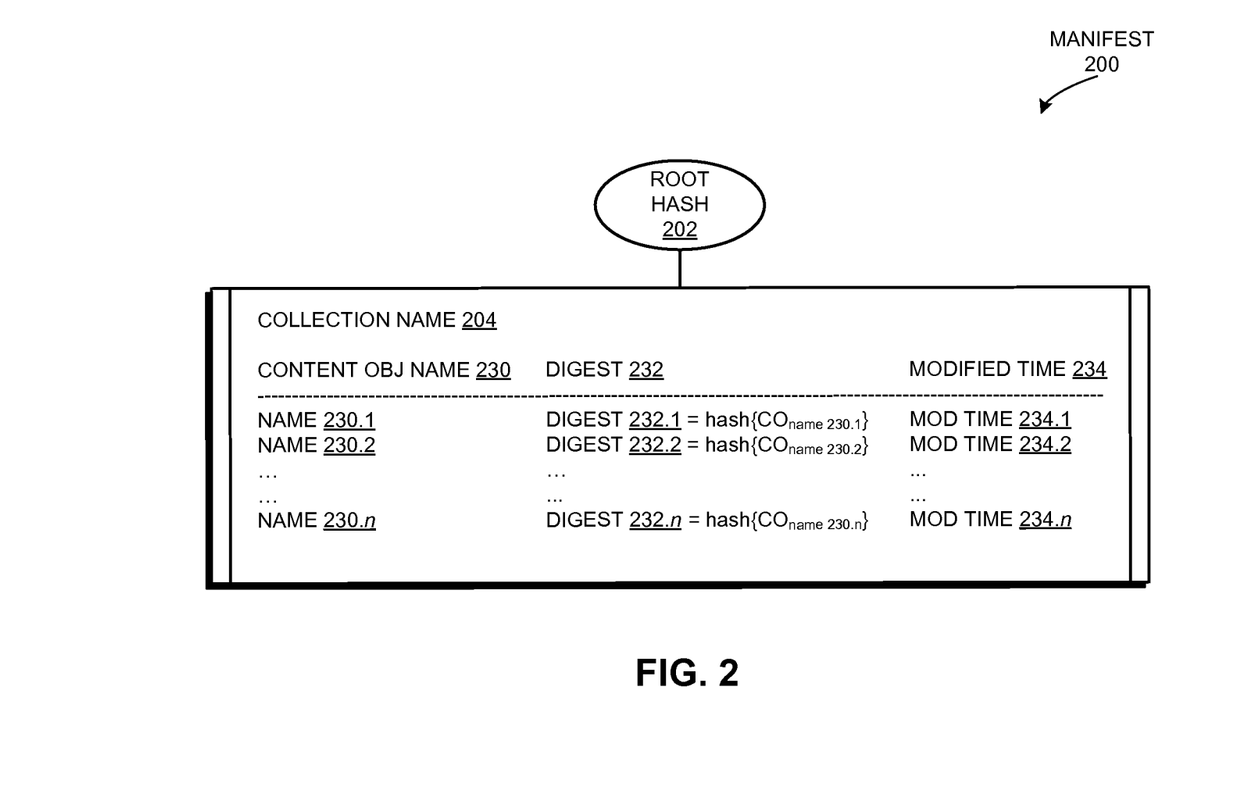
FIG. 2 presents a diagram illustrating the format of a manifest, in accordance with an embodiment of the present invention.

In the manifest, each Content Object is identified by its name and corresponding digest, where the digest is the hash value (often computed using a cryptographic hash function, such as hash function SHA-256) of the Content Object. In some embodiments, each Content Object is also identified by a modified time indicating the time that the content was modified. FIG. 2 presents a diagram illustrating the format of a manifest, in accordance with an embodiment of the present invention.

In FIG. 2, manifest 200 includes an ordered list of Content Objects identified by a collection name 204 and one or more of the following: a Content Object name 230.1-230.n; a digest 232.1-232.n; and a modified time 234.1-234.n. The digests 232.1-232.n include a hash value of the Content Object identified respectively by names 230.1-230.n. Manifest 200 also includes a root hash 202, which is an additive hash value based on the hash values 232.1-232.n of the individual Content Objects in the collection. Root hash 202 of manifest 200 is a unique identifier for manifest 200.

As shown in FIG. 2, manifest 200 can indicate a name and corresponding digest for each Content Object represented in the collection. Optionally, manifest 200 can also include a modified time for each Content Object represented in the collection. The use of the modified time field depends on the underlying application or service being performed. In addition to an ordered list, the manifest may also be structured as a synchronization tree, which contains Content Objects as well as nested collections of Content Objects.

In some embodiments, to download a file collection, a requester may need to first download the manifest. In certain situations, the manifest itself is protected, and before reading the manifest, the requester or content consumer needs to authenticate the manifest, and may also need to decrypt the manifest as well.

Parallel Content Retrieval

Figure 3:
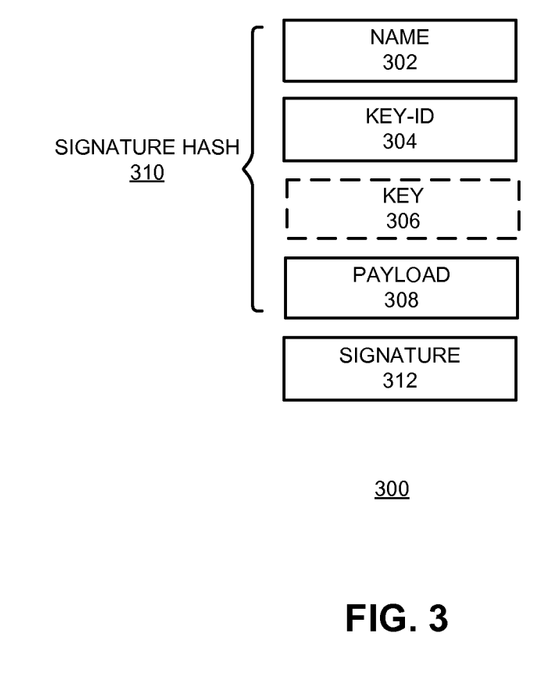
FIG. 3 presents a diagram illustrating an exemplary Content Object in content-centric networks.

In CCN, every Content Object is signed and potentially encrypted. FIG. 3 presents a diagram illustrating an exemplary Content Object in content-centric networks. In FIG. 3, Content Object 300 includes a name component 302, a key-ID component 304, an optional key component 306, a payload component 308, and a signature component 312. Name component 302 is a non-cryptographic user-assigned string, which can be an HSVLI in a human-readable form or a flat name. Key-ID component 304 identifies a public key used to sign Content Object 300. The public key can be optionally included in Content Object 300 as key component 306. Payload component 308 includes the user data. Signature component 310 is a cryptographic signature that binds name component 302 to payload component 308. The signature can be generated using an RSA scheme. For example, the publisher of the content can generate the signature using its private key, which is verifiable using public key 306. Note that, instead of signing all the bytes, the signature is usually generated by signing a hash of name component 302, key-ID component 304, key component 306, and payload component 308, shown as a signature hash 310.

In some embodiments, Content Object 300 may be encrypted, and Content Object 300 may include an additional component that specifies the decryption key. In some further embodiments, an entire content component, which can be a file of any type, such as audio, video, JavaScript files, etc., may be encrypted and signed as a whole. For example, a large video file may span many Content Objects, and to ensure that the content of the file remain confidential, the entire video file, and hence the many Content Objects are encrypted. To guarantee the authenticity of each chunk of the file (or each Content Object), the publisher may sign each Content Object. Moreover, to bind all the chunks (Content Objects) together, the publisher may also sign all chunks of a content component as a whole. An identifier of the encryption key and the signature for the entire component may be inserted into the last chunk (Content Object) or be included in a separate Content Object.

Upon receiving the Content Objects, in order to authenticate the received Content Objects, the requester needs to verify the signing key. In some embodiments, the key-verification process involves contacting a trust authority to verify whether the key (specified by the key information included in the received Content Objects) is actually authorized to sign the content, and computing and verifying the signatures included in the received Content Objects. In addition, in order to access the encrypted content, the requester needs to obtain the decryption key. In certain situations, the keys that are required to decrypt the content (such as a movie) are generated based on the user trying to consume the content (such as a user viewing the movie). For example, when a user is downloading a movie, there might be session keys generated specifically for the user. The user needs to obtain those session keys. Moreover, in situations where the manifest is encrypted, the requester also needs to obtain the decryption key for the manifest. In conventional systems, the requester needs to download the manifest, the content, the authentication information for the manifest and the content, the decryption information (in order to obtain the decryption key) for the manifest and the content, and any possible revocation information for authentication, often in a sequential order. This means many round trips will be needed before the requester obtains all information needed for the consumption of the content.

Figure 4:
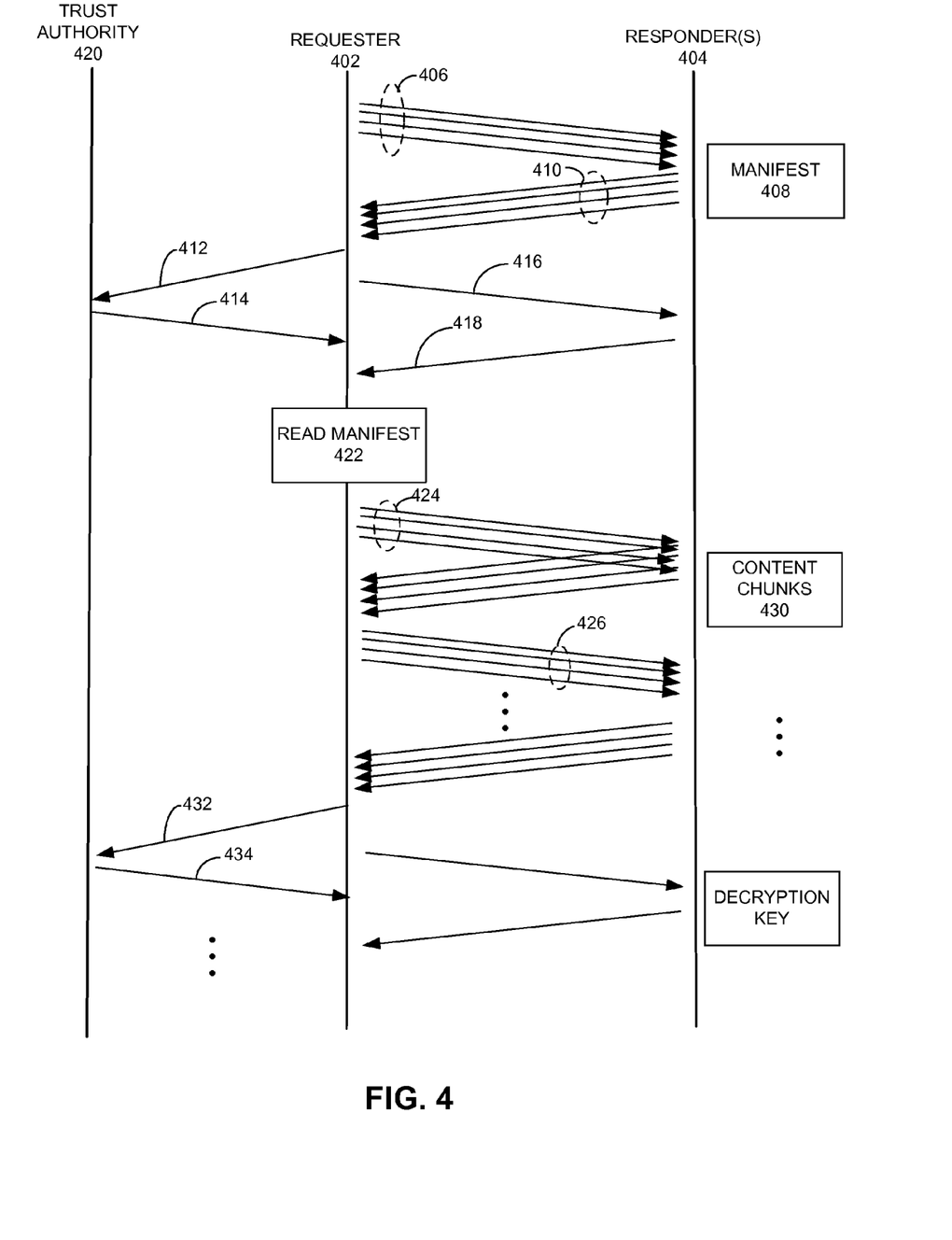
FIG. 4 provides a diagram illustrating a conventional content-downloading process.

FIG. 4 provides a diagram illustrating a conventional content-downloading process. In FIG. 4, a requester 402 is downloading a content collection from one or more responders 404. During operation, requester 402 starts the downloading process by issuing a set of Interest messages 406 to responder(s) 404 to request manifest 408. In some embodiments, manifest 408 includes an ordered list of Content Objects. Upon receiving manifest 408, which is returned to requester 402 as a set of Content Objects 410, requester 402 may need to send a request 412 to a trust authority 420, inquiring whether the key or keys used to sign Content Object set 410 are authorized key(s), and receive a response 414. Optionally, requester 402 may also send a request 416 to responder(s) 404 to request a session key, and receive a response 418. Note that the authentication request and the key request are sent in the form of Interests, and the responses are in the form of Content Objects. Once requester 402 authenticates and decrypts manifest 408, its reads manifest 408 (operation 422), and starts to request chunks of the content collection by sending additional sets of Interest messages, such as Interest sets 424 and 426. Depending on the size of the content collection, many Interests or sets of Interests may be needed to retrieve content chunks 430. In the event where content chunks 430 are signed as a whole, requester 402 may need to, upon completing the download of content chunks 430, send a request 432 to trust authority 420 to verify the signing key, and receive a response 434. In addition, if content chunks 430 are encrypted, requester 402 may need to request the decryption key, which can involve one or more round trips. Additional communication between requester 402 and trust authority 420 may include requester 402 requesting possible revocation information, such as a certification revocation, if any, from trust authority 420.

From FIG. 4, one can see that many round trips are needed for requester 402 to complete the downloading of the manifest and the content chunks, to authenticate the manifest and the content chunks (by verifying signatures), and to obtain decryption keys. In other words, a user or content consumer may need to wait for many round trips before he can consume the content. Such a long wait time is not desirable. For example, if a user intends to view a movie online, it is desirable that the user can start viewing front portions of the movie while downloading end portions of the movie. However, in conventional CCN systems where content is authenticated and decrypted after it is downloaded, the user may need to download the entire movie first before he can start viewing the movie.

To solve the problem of delayed content consumption, in some embodiments, when requesting a content collection, the requester sends out Interests for retrieving the content chunks and Interests for retrieving information needed for consumption of the content in parallel. Therefore, information, including authentication information and decryption information, that is needed for the consumption of the content can be retrieved in parallel with the content itself, and the user no longer needs to wait until all content chunks are downloaded before starting to consume the content. In the example of movie downloading, while downloading the first portion of a movie, the user may simultaneously obtain the session key and verify the authenticity of the received first portion. Subsequently, the user can start viewing the movie (after decryption) as the remaining portions of the movie are being downloaded. Similarly, if the content collection is a file library, the user may start to consume the already downloaded files while other files are still being downloaded.

Figure 5:
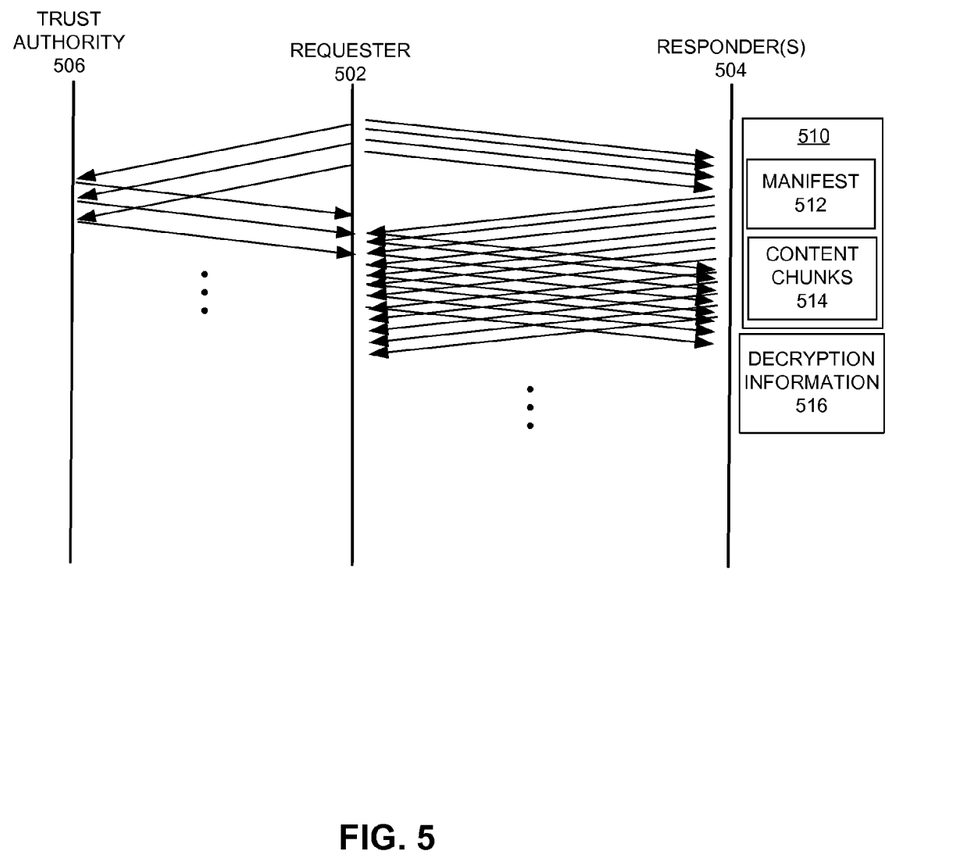
FIG. 5 presents a diagram illustrating an exemplary process of downloading a content collection, in accordance with an embodiment of the present invention.

FIG. 5 presents a diagram illustrating an exemplary process of downloading a content collection, in accordance with an embodiment of the present invention. In FIG. 5, a requester 502 is requesting a content collection 510 from one or more responders 504. Content collection 510 includes various components, such as a manifest 512 and content chunks 514. Note that manifest 512 and content chunks 514 each may include multiple Content Objects that conform to CCN standards. Moreover, the Content Objects may be individually signed or signed as a whole. In some situations, manifest 512 and/or content chunks 514 can be encrypted, and requester 502 also needs to request decryption information 516 in order to access manifest 512 and/or content chunks 514. Decryption information 516 may indicate what types of key or keys are needed for decrypting content chunks 514.

Instead of requesting manifest 512, content chunks 514, and decryption information 516 one by one, requester 502 may send out Interests for them all at once. In other words, requester 502 can request the manifest, the content chunks, and the decryption information using a lump sum set of Interests. Note that, in some embodiments, the content chunks may include embedded objects whose names or hash values are not known to requester 502. In such a situation, requester 502 may need to first download and read the manifest before sending out a large set of Interests to request the content chunks along with the decryption information. In certain situations, the manifest and the embedded objects may be placed in a single content stream under one chunked namespace, and requester 502 can send out Interest sets in that chunked namespace to request, simultaneously, manifest 512 and content chunks 514.

Moreover, to authenticate manifest 512 and content chunks 514, requester 502 may also need to send a set of Interests to trust authority 506 to inquire about the signing keys. In some embodiments, requester 502 can send such an inquiry at the same time requester 502 is sending the initial set of Interests. In such a situation, because requester 502 has not yet downloaded manifest 512 or content chunks 514, requester 502 has no knowledge of what key or keys are used to sign manifest 512 and content chunks 514. However, even without such knowledge, requester 502 can send a request to trust authority 506, requesting a list of signing keys that are authorized to sign manifest 512 and/or content chunks 514. For example, if content collection 510 is under the namespace "/foo/abc," requester 502 may send a request to trust authority 506, requesting a list of signing keys authorized to sign under the namespace "/foo/abc."

In some embodiments, requester 502 may include, in the lump sum set of Interests, additional information that may be needed by responders 504 in order for responders 504 to send back Content Objects corresponding to the Interests. This additional information can include, but is not limited to: user information (such as user credentials) and certain payment information, or any other information required by the content provider.

In some embodiments, the parallel downloading of content and information needed for consumption of the content may be triggered by the initial set of Interests sent out by the requester for the content. For example, the requester may broadcast, over the network, a set of Interests under the namespace "/foo/abc/video/video_1." The Interests reach an intermediate system or node, such as a router, a gateway, a proxy server, or a cache server, which in turn determines that content chunks under the namespace "/foo/abc/video/video_1" are individually (or collectively) signed and encrypted. In some embodiments, the intermediate node may indicate to the requester that signature information and decryption information will be needed to consume the content. In further embodiments, the intermediate node may simultaneously issue, on behalf of the content requester, Interests for downloading the content, Interests for verifying the signatures (sent to the trust authority), and Interests for obtaining decryption information. The intermediate node may also issue an Interest to the trust authority to obtain possible revocation information for authentication.

In addition to issuing Interests for parallel downloading of content and other related information, the intermediate node may also be responsible for processing the responses to the Interests. For example, the intermediate node may receive a list of authorized signing keys, compare the list with signatures included in the content chunks to determine the authenticity of the content chunks, and then forward the authentication result to the content requester. Moreover, if the response indicates the type of decryption key needed for decrypting the content chunks, the intermediate node may obtain (via certain computation) the decryption key and forward it to the requester. Note that the process of determining what information is needed and generating parallel requests (Interests) to download the content along with related information may be transparent to an application that requests the content. In some embodiments, the application only needs to send one Interest to request a content collection, and processes running on other layers are handling the generation of additional Interests for the parallel downloading.

Figure 6:
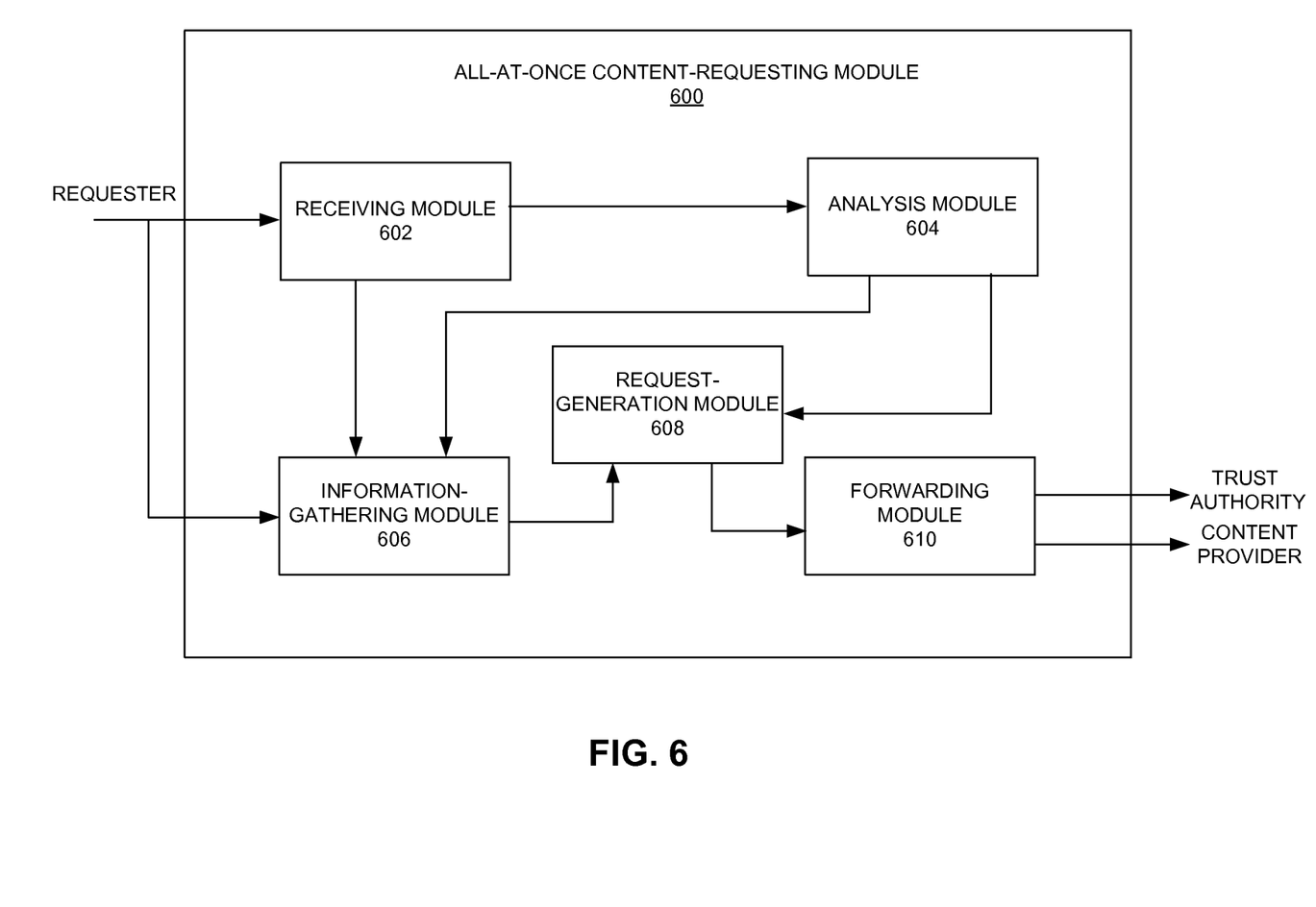
FIG. 6 presents a diagram illustrating an exemplary architecture of an all-at-once content-requesting module, in accordance with an embodiment of the present invention.

FIG. 6 presents a diagram illustrating an exemplary architecture of an all-at-once content-requesting module, in accordance with an embodiment of the present invention. In FIG. 6, all-at-once content-requesting module 600 includes a receiving module 602, an analysis module 604, an information-gathering module 606, a request-generation module 608, and a forwarding module 610. Receiving module 602 is responsible for receiving Interests for a content collection. In some embodiments, receiving module 602 may receive a single initial Interest or a set of initial Interests, requesting a piece of content under a certain namespace. Analysis module 604 is responsible for analyzing the initial Interest and determining what additional information will be needed for the delivery and consumption of the content. For example, analysis module 604 may determine, based on the received Interest, that a payment is needed before the content can be delivered to the requester, or analysis module 604 may determine that the content chunks are encrypted and decryption information will be needed for consumption of the content. In some embodiments, analysis module 604 may directly interact with the content producer (based on the namespace specified by the initial Interest) to determine what type of additional information is needed. Additionally, analysis module 604 may interact with a directory service to find out what information is needed.

Information-gathering module 606 is responsible for gathering, from the requester, additional information that is required before the content can be delivered. For example, information-gathering module 606 may collect user credential and/or payment information from the requester. Request-generation module 608 is responsible for generating sets of parallel Interests that can be used to request the content chunks as well as information (such as authentication information and decryption information) needed for the consumption of the content. In some embodiments, request-generation module 608 generates the sets of parallel Interests based on the analysis outcome of analysis module 604 and the information gathered by information-gathering module 606. For example, if authentication is needed, request-generation module 608 generates requests that can be sent to a trust authority for authentication purposes. Moreover, if payment information is needed, request-generation module 608 generates content requests that include the payment information. Forwarding module 610 is responsible for forwarding the generated set of requests in parallel to the trust authority and to the content provider.

Figure 7:
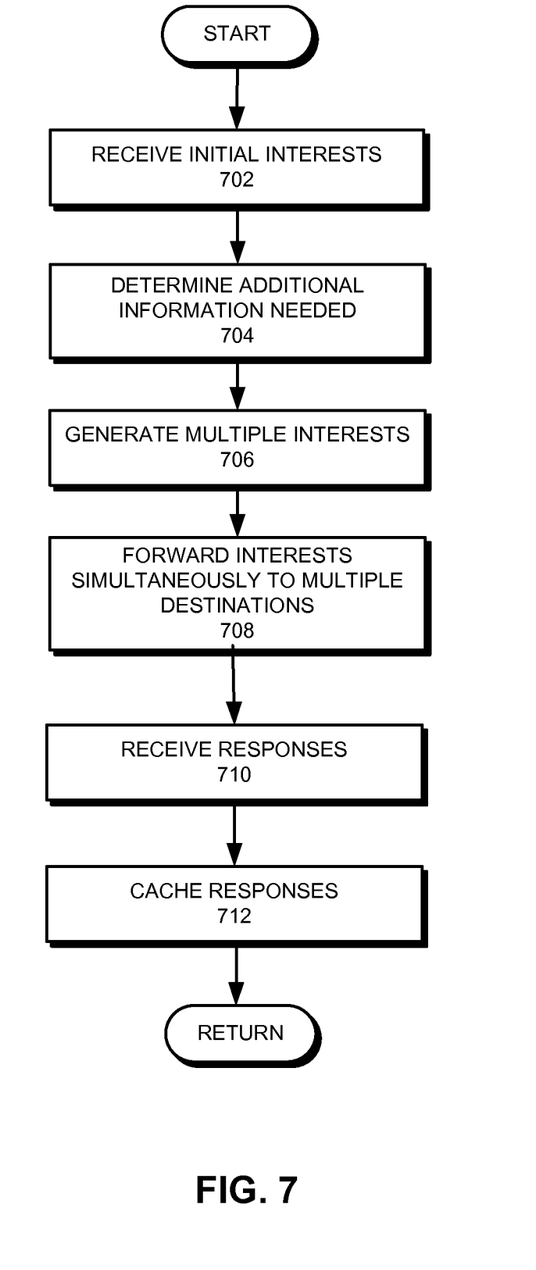
FIG. 7 presents a diagram illustrating an exemplary process of requesting content, in accordance with an embodiment of the present invention.

FIG. 7 presents a diagram illustrating an exemplary process of requesting content, in accordance with an embodiment of the present invention. During operation, the system receives an Interest for a content piece (operation 702), and determines, based on the received Interest, additional information that may be needed for the delivery and consumption of the content piece (operation 704). Based on the determination, the system generates multiple Interests or sets of Interests for requesting content chunks (which can include a catalog or manifest) and information that is needed for the consumption of the content, such as authentication information, decryption information, and possible authentication revocation information (operation 706). For example, the system may generate a request for a list of signing keys that are authorized to sign under a particular namespace. Note that if the content or its catalog is not encrypted, there is no need to generate Interest for decryption information.

The system then simultaneously forwards the generated Interests or sets of Interests to their intended destinations, which can include a trust authority and a node that has cached copies of the content chunks (operation 708). Once the Interests are forwarded, the system may start to receive responses, which can include content chunks or authentication results (operation 710). In some embodiments, authentication responses may include a list identifying signing keys that are authorized to sign Content Objects under a particular namespace. The system optionally caches the received responses, including authentication responses, such that subsequent requests can be served faster (operation 712).

Note that all-at-once content-requesting module 600 shown in FIG. 6 may be located at the same local machine as the content requester, or all-at-once content-requesting module 600 may be located at a remote, intermediate system, such as a router, a gateway, a proxy or cache server, etc. Similarly, the content-requesting process shown in FIG. 7 may occur in a local system or a remote system.

Also note that the purpose for issuing multiple Interests or sets of Interests in parallel is to reduce the number of round trips needed before a content requester can start consuming the requested content. Ideally, a requester may start to consume the content within one or even less than one round trip, because the Interests for content chunks and the related authentication or decryption information are sent out simultaneously. In practice, however, more than one round trip or more than one message exchange may be needed before the requester receives the content chunks and the additional information needed for consumption of the content. For example, in the event of some Content Objects including external links, the requester may need to first resolve the external link, and then issue Interests following the links.

Computer and Communication System

Figure 8:
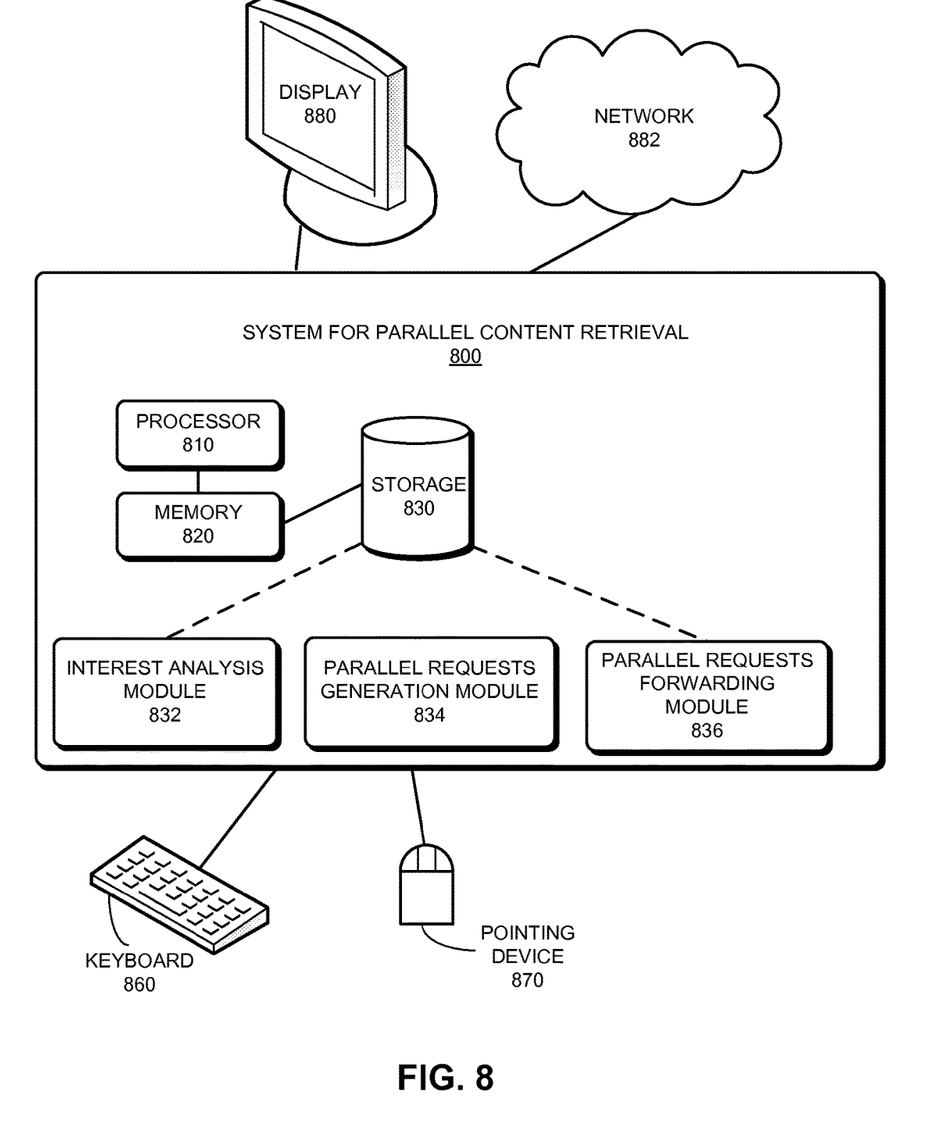
FIG. 8 illustrates an exemplary system for parallel content retrieval, in accordance with an embodiment.

FIG. 8 illustrates an exemplary system for parallel content retrieval, in accordance with an embodiment. A system 800 for parallel content retrieval comprises a processor 810, a memory 820, and a storage 830. Storage 830 typically stores instructions that can be loaded into memory 820 and executed by processor 810 to perform the methods mentioned above. In one embodiment, the instructions in storage 830 can implement an Interest analysis module 832, a parallel requests generation module 834, and a parallel requests forwarding module 836, all of which can be in communication with each other through various means.

In some embodiments, modules 832, 834, and 836 can be partially or entirely implemented in hardware and can be part of processor 810. Further, in some embodiments, the system may not include a separate processor and memory. Instead, in addition to performing their specific tasks, modules 832, 834, and 836, either separately or in concert, may be part of general- or special-purpose computation engines.

Storage 830 stores programs to be executed by processor 810. Specifically, storage 830 stores a program that implements a system (application) for facilitating parallel content retrieval. During operation, the application program can be loaded from storage 830 into memory 820 and executed by processor 810. As a result, system 800 can perform the functions described above. System 800 can be coupled to an optional display 880 (which can be a touch screen display), keyboard 860, and pointing device 870; system 800 can also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for retrieving a content collection that includes a plurality of content objects over a content centric network (CCN), the method comprising:
   generating Interests under a predetermined namespace, the Interests including:
   at least one first Interest for a catalog of the content collection that includes an ordered list identifying encrypted content chunks;
   at least one second Interest for the encrypted content chunks; and
   at least one third Interest for content-access information for consumption of the content collection, including decryption information indicating one or more keys for decrypting the encrypted content chunks;
   sending to a trust authority over the CCN an Interest for a list of signing keys authorized to sign the catalog and/or the plurality of content objects, and receiving from the trust authority the list of the singing keys;
   simultaneously with the sending to the trust authority the Interest for the list, forwarding to a node of the CCN the at least one first Interest, the at least one second Interest, and the at least one third Interest; and
   receiving from the node in the form of content objects the content collection including the encrypted content chunks, the catalog of the content collection, and the content-access information including the decryption information.

2. The method of claim 1, wherein the catalog is encrypted and the content-access information further includes decryption information for decrypting the catalog and authentication information for the content collection.

3. The method of claim 1, further comprising:
   receiving an indication that signature information or decryption information is used for the consumption of the content collection.

4. The method of claim 1, further comprising:
   receiving an Interest for the content object, wherein the generating is performed based on the receiving the Interest.

5. The method of claim 1, further comprising:
   sending a request for a signing key that signed the catalog for the content collection.

6. The method of claim 1, further comprising:
   verifying a signing key, wherein the content object includes an identifier of a key used to sign the content object.

7. The method of claim 1, wherein a content object among the content objects includes a name, a key ID, a payload, and a signature, wherein the key ID identifies a key used to sign the content object, and the signature is generated by signing a hash of at least the name, the key ID, and the payload.

8. A non-transitory, computer-readable storage medium storing instructions that, when executed by a computing device, cause the computing device to perform a method for retrieving a content collection that includes a plurality of content objects over a content centric network (CCN), the method comprising:
   generating Interests under a predetermined namespace, the Interests including:
   at least one first Interest for a catalog of the content collection that includes an ordered list identifying encrypted content chunks;
   at least one second Interest for the encrypted content chunks; and
   at least one third Interest for content-access information for consumption of the content collection, including decryption information indicating one or more keys for decrypting the encrypted content chunks;
   sending to a trust authority over the CCN an Interest for a list of signing keys authorized to sign the catalog and/or the plurality of content objects, and receiving from the trust authority the list of the singing keys;
   simultaneously with the sending to the trust authority the Interest for the list, forwarding to a node of the CCN the at least one first Interest, the at least one second Interest, and the at least one third Interest; and receiving from the node in the form of content objects the content collection including the encrypted content chunks, the catalog of the content collection, and the content-access information including the decryption information.

9. The computer-readable storage medium of claim 8, wherein the catalog is encrypted and the content-access information further includes decryption information for decrypting the catalog and authentication information for the content collection.

10. The computer-readable storage medium of claim 8, the method further comprising:
   receiving an indication that signature information or decryption information is used for the consumption of the content collection.

11. The computer-readable storage medium of claim 8, the method further comprising:
   receiving an Interest for the content object, wherein the generating is performed based on the receiving the Interest.

12. The computer-readable storage medium of claim 8, the method further comprising:
   sending a request for a signing key that signed the catalog for the content collection.

13. The computer-readable storage medium of claim 8, the method further comprising;
   verifying a signing key, wherein the content object includes an identifier of a key used to sign the content object.

14. The computer-readable storage medium of claim 8, wherein a content object among the content objects includes a name, a key ID, a payload, and a signature, wherein the key ID identifies a key used to sign the content object, and the signature is generated by signing a hash of at least the name, the key ID, and the payload.

15. A computer system for retrieving a content collection that includes a plurality of content objects over a content centric network (CCN), the system comprising:
   a processor; and
   a storage device coupled to the processor and storing instructions that, when executed by the processor, cause the processor to perform a method, the method including:
   generating Interests under a predetermined namespace, the Interests including:
      at least one first Interest for a catalog of the content collection that includes an ordered list identifying encrypted content chunks;
      at least one second Interest for the encrypted content chunks; and
      at least one third Interest for content-access information for consumption of the content collection, including decryption information indicating one or more keys for decrypting the encrypted content chunks;
   sending to a trust authority over the CCN an Interest for a list of signing keys authorized to sign the catalog and/or the plurality of content objects, and receiving from the trust authority the list of the singing keys;
   simultaneously with the sending to the trust authority the Interest for the list, forwarding to a node of the CCN the at least one first Interest, the at least one second Interest, and the at least one third Interest; and
   receiving from the node in the form of content objects the content collection including the encrypted content chunks, the catalog of the content collection, and the content-access information including the decryption information.

16. The system of claim 15, wherein the catalog is encrypted and the content-access information further includes decryption information for decrypting the catalog and authentication information for the content collection.

17. The system of claim 15, the method further including receiving an indication that signature information or decryption information is used for the consumption of the content collection.

18. The system of claim 15, the method further including receiving an Interest for the content object, wherein the generating is performed based on the receiving the Interest.

19. The system of claim 15, the method further including sending a request for a signing key that signed the catalog for the content collection.

20. The system of claim 15, wherein a content object among the content objects includes a name, a key ID, a payload, and a signature, wherein the key ID identifies a key used to sign the content object, and the signature is generated by signing a hash of at least the name, the key ID, and the payload.

* * * * *